July 18, 1933.  W. BECKMANN ET AL  1,918,370
PLANT FOR MANUFACTURING CHLORINATION PRODUCTS OF CAOUTCHOUC
Filed Oct. 31, 1931  2 Sheets-Sheet 1
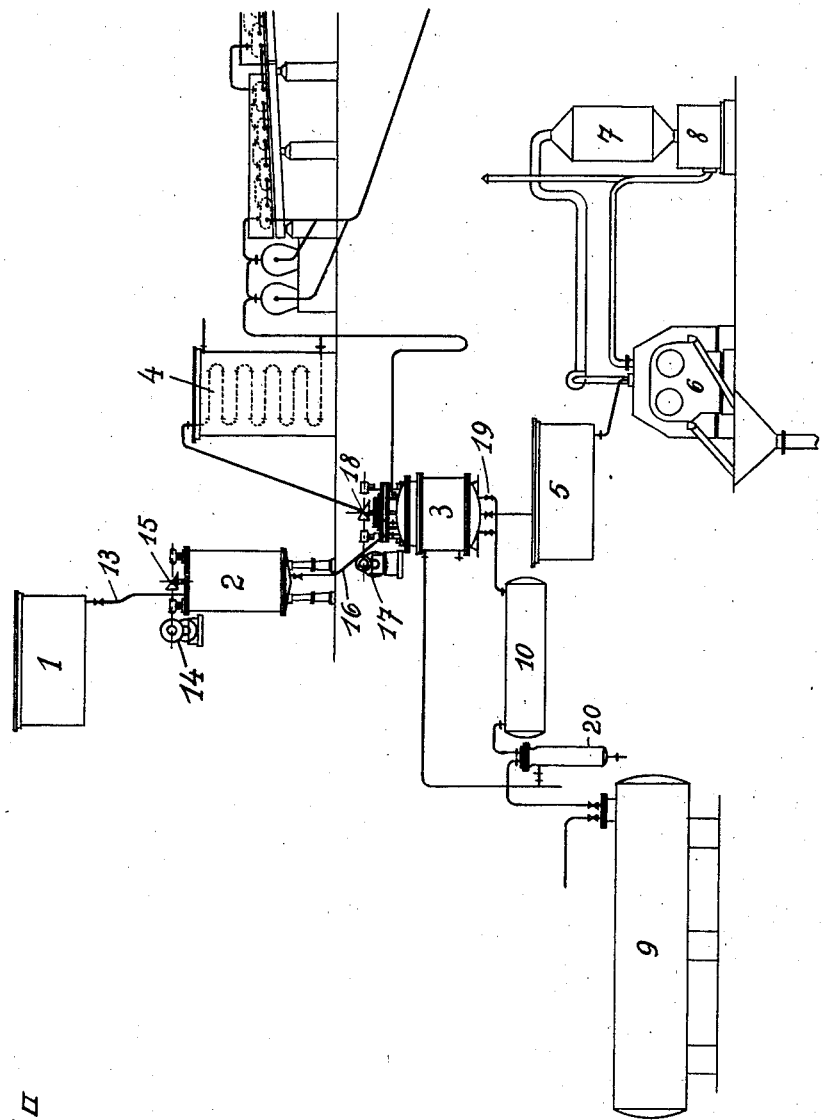
INVENTORS
Walter Beckmann,
Max Kluenies and
Andreas Nielsen,
By Watson, Cole, Morse & Grindle
Attys July 18, 1933.  W. BECKMANN ET AL  1,918,370
PLANT FOR MANUFACTURING CHLORINATION PRODUCTS OF CAOUTCHOUC
Filed Oct. 31, 1931  2 Sheets-Sheet 2
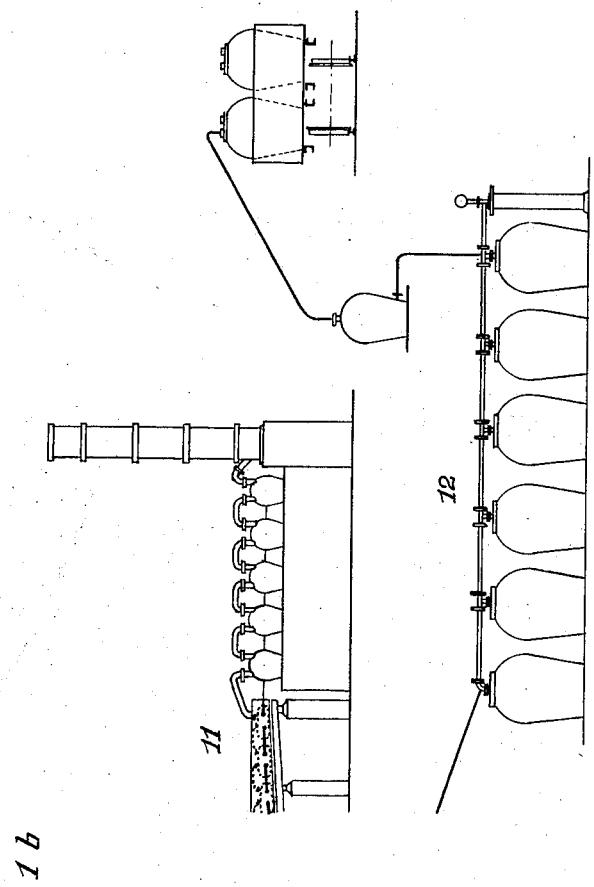
INVENTORS
Walter Beckmann,
Max Klevenis and
Andreas Nilsen,
By
Watson, Coit, Morse & Grindle
Attys.

Patented July 18, 1933

1,918,370

UNITED STATES PATENT OFFICE

WALTER BECKMANN, OF TORNESCH, AND MAX DESENISS AND ANDREAS NIELSEN, OF HAMBURG, GERMANY, ASSIGNORS TO THE FIRM OF NEW YORK HAMBURGER GUMMI WAAREN COMP., OF HAMBURG, GERMANY

PLANT FOR MANUFACTURING CHLORINATION PRODUCTS OF CAOUTCHOUC

Application filed October 31, 1931, Serial No. 572,422, and in Germany November 10, 1930.

Our invention relates to improvements in systems for manufacturing chlorination products of caoutchouc, and the object of the improvements is to provide systems by means of which the said products may be manufactured on a large scale. With this object in view our invention consists in the combination of apparatus in which the successive steps of the manufacture of the said products are continuously carried out, and in which the substances are separated from each other, combined or regenerated as the progress of the process demands.

For the purpose of explaining the invention an example embodying the same has been illustrated in the accompanying drawings, Fig. 1a and Fig. 1b in which the system is shown in a diagrammatical way.

In the example shown in the drawings the system comprises a container 1 in which a suitable solvent such as carbon tetrachloride is stored. The container 1 is connected by a pipe 13 with a stirring apparatus 2 to which raw caoutchouc is supplied and a suitable amount of carbon tetrachloride, the matter being stirred for dissolving the caoutchouc. The stirring means are represented in the figures by the driving mechanism thereof comprising a motor 14 and a bevel-gear 15. For example, in the said stirring apparatus a 5% solution of raw caoutchouc in carbon tetrachloride is produced. The stirring apparatus is connected by a pipe 16 with a chlorination receptacle 3 which is provided with heating and stirring means. Within the said stirring apparatus chlorine is added to the solution of caoutchouc. The solution is heated to the boiling temperature of the carbon tetrachloride before the chlorine is added, which is necessary for producing stable chlorination products. If it is not desired to manufacture highly stable chlorination products, the chlorine may be added to the solution before the boiling point has been attained. Further, for obtaining rapid and uniform chlorination the solution must be stirred. If the solution is not stirred the caoutchouc solution is made non-homogeneous which results into a loss of chlorine, and which may even prevent thorough chlorination. In the figures the stirring mechanism has been represented by the driving mechanism 17 and a bevel-gear 18. Preferably the chlorine is uniformly distributed within the solution by being supplied through a plurality of nozzles, which, preferably, are distributed circumferentially around the apparatus, as is indicated in a diagrammatical way, at 19. Preferably means are provided for regulating the supply of the chlorine through the nozzles and for disconnecting all the nozzles or a part thereof from the supply of chlorine. The chlorine is blown or pressed into the solution through the said nozzles. The nozzles are provided with check valves by means of which they are rapidly and automatically closed when the supply of chlorine to the apparatus is accidentally or intentionally interrupted, so that the solution is prevented from flowing from the apparatus 3 and through the nozzles into the pipe supplying the chlorine. The said check valves are constructed so that the nozzles are automatically closed and that they may be dismounted, cleaned and again mounted in the apparatus. The hydrochloric acid which is produced within the apparatus 3 is removed in a suitable way, as will be described hereinafter.

The apparatus 3 is provided with a try-cock by means of which a proof may be taken from the apparatus 3 for ascertaining the progress and the degree of the chlorination. Further, the chlorination apparatus 3 is provided with an illuminated display glass by means of which the matter to be chlorinated may be continuously absorbed during chlorination, and the successive stages of the chlorination may be ascertained from the consistency and the movement of the mass.

After chlorination has been completed, and any excess of chlorine has been vaporized in the manner to be described hereinafter, the chlorinated mass is delivered into a container 5, from which it is brought into a drying apparatus 6. The said drying apparatus may be a drier comprising rollers which is equipped with a tightening jacket and internal heating means, and which may be operated either under a vacuum or under atmospheric pressure. The vacuum may be produced by means of a fan, and the arrangement may be such that the vacuum is different above and below the rollers. The apparatus is provided with automatic valves adapted to maintain the vacuum in case of an access of fresh air. Further it may be a drier of the type in which the matter is dried by atomization either by a blast of air, a blast of steam or by mechanical means. The drying apparatus is connected with a regenerating apparatus comprising a cooler 7 and a drying apparatus 8, for recovering the carbon tetrachloride. In a modification, the chlorinated caoutchouc is dried by precipitation, for example by injecting the chlorinated product through suitable nozzles into gasoline, benzine or similar media.

By the drying process a solid white body is obtained according to the drying process in a more or less fine state, and which is brought into the desired form by suitable further treatment.

The chlorine which is needed in the manufacture of the chlorine-caoutchouc is stored under pressure in a container 9, and it is supplied to the chlorination apparatus 3 through a liquid separator 10. There may be a vaporizing apparatus 20. By the chlorination process within the apparatus 3 hydrochloric acid is split off, and the hot vapour of hydrochloric acid escaping from the apparatus is loaded with carbon tetrachloride, and, in the later stages of the chlorination, it contains a slight amount of chlorine. The said mixture of hydrochloric acid, carbon tetrachloride and chlorine is passed through a cooler 4 in which it is cooled to about 20° C. Thereby carbon tetrachloride is separated which largely absorbs the chlorine contained in the waste gas. The said liquid product is returned into the chlorination apparatus 3. The gaseous hydrochloric acid, which has been cooled to about 20° C., still contains a certain amount of carbon tetrachloride corresponding to the tension, and a slight amount of chlorine.

The said gas is passed through a hydrochloric acid absorption plant 11 in which the hydrochloric acid is absorbed in the manner known in the art. During the absorption of the hydrochloric acid the carbon tetrachloride is gradually condensed in accordance with the absorption of the hydrochloric acid. In special towers the carbon tetrachloride is separated, and from the said towers it is supplied to separate apparatus. The concentrated hydrochloric acid does not contain any carbon tetrachloride, and it is collected in a storing apparatus. The carbon tetrachloride which is separated during the last absorption of hydrochloric acid takes up the last traces of chlorine, so that the by-product of the process is obtained in the form of a marketable hydrochloric acid which is free of chlorine.

Within the hydrochloric acid absorption and storing apparatus 11, 12 the chlorine containing carbon tetrachloride which has not been condensed within the cooler 4 are condensed, the said components being separated by specific gravity and overflows, and being carried into storing receptacles by means of suitable hoisting means.

We claim:

1. The herein described plant for manufacturing chlorination products of caoutchouc, comprising a stirring apparatus for dissolving caoutchouc in a suitable solvent, a chlorination apparatus connected with said stirring apparatus for receiving the dissolved caoutchouc therefrom, heating means for said chlorination apparatus, means for supplying chlorine under pressure to said chlorination apparatus whereby a solution of chlorinated caoutchouc is formed and hydrochloric acid is evolved, a collecting apparatus connected with said chlorination apparatus for receiving therefrom the chlorinated solution, a drying apparatus connected with said collecting apparatus for separating the chlorinated caoutchouc from the solvent, a cooler connected with said drying apparatus to receive the solvent therefrom for recovering the same, a drying apparatus connected with said cooler, and cooling, absorption and storing apparatus connected with said chlorination apparatus for recovering the hydrochloric acid.

2. A system as claimed in claim 1, in which the chlorination apparatus is equipped with a plurality of nozzles distributed around said chlorination apparatus and connected with the supply of chlorine, means for regulating the supply of chlorine through said nozzles, means for individually disconnecting said nozzles from said chlorination apparatus, and check valves for said nozzles.

3. A system as claimed in claim 1, in which the chlorination apparatus is provided with a display glass disposed so that the progress of the chlorination may be observed, and with a try-cock for taking samples from the matter being chlorinated.

4. A system as claimed in claim 1, in which the drying apparatus connected with the chlorination apparatus includes a drier of the roller type comprising a tightening jacket and heating means, means for producing a vacuum within the drying apparatus of different degree above and below the rollers.

5. A system as claimed in claim 1, in which the drying apparatus comprises a sealed jacket, in which means are provided for producing a vacuum within the said drying apparatus, and in which means are provided for condensing the solvent.

6. A system as claimed in claim 1, in which the drying apparatus includes a drier acting on the atomization principle, and in which means are provided for providing a blast of a fluid for atomizing the matter to be dried, and in which means including a cooler are provided for regenerating the solvent.

7. A system as claimed in claim 1, in which the drying apparatus takes the form of a drier acting on the atomization principle, and in which means are provided for producing a jet of steam for atomizing the matter to be dried.

8. A system as claimed in claim 1, in which means are connected with the chlorination apparatus for separating the chlorinated caoutchouc.

9. A system as claimed in claim 1, in which cooling, absorption and storing apparatus for hydrochloric acid are provided with means for condensing the carbon tetrachloride containing chlorine, the said means comprising separating apparatus acting by the specific gravity of the components and means for lifting the components to the storing apparatus.

10. In apparatus for manufacturing chlorination products of caoutchouc by the action of chlorine gas on a solution of the caoutchouc, the combination with a solution forming receptacle having stirring means therein, of a second receptacle, a conduit for connecting said receptacles, means for delivering gas under pressure to said second receptacle, means for effecting intimate mixture of the contents of said second receptacle, a drying apparatus, means for discharging liquid from said second receptacle into said drying apparatus, a condenser for gases, and means for conveying gases from said second receptacle to said condenser.

11. In apparatus for manufacturing chlorination products of caoutchouc by the action of chlorine gas on a solution of the caoutchouc, the combination with a solution forming receptacle having stirring means therein, of a second receptacle, a conduit for connecting said receptacles, means for delivering gas under pressure to said second receptacle, said means including a nozzle disposed in the lower portion of said second receptacle and a check valve cooperating with said nozzle to prevent drainage of liquid therethrough, means for effecting intimate mixture of the contents of said second receptacle, a drying apparatus, means for discharging liquid from said second receptacle into said drying apparatus, a condenser for gases, and means for conveying gases from said second receptacle to said condenser.

12. In apparatus for manufacturing chlorination products of caoutchouc by the action of chlorine gas on a solution of the caoutchouc, the combination with a solution forming receptacle having stirring means therein, of a second receptacle, a conduit for connecting said receptacles, means for delivering gas under pressure to said second receptacle, means for effecting intimate mixture of the contents of said second receptacle, a drying apparatus, means for discharging liquid from said second receptacle into said drying apparatus, a condenser for gases, means for conveying gases from said second receptacle to said condenser, and means for returning condensed liquid from said condenser to said second receptacle.

WALTER BECKMANN.
MAX DESENISS.
ANDREAS NIELSEN.